United States Patent
Taomo et al.

[11] Patent Number: 5,914,414
[45] Date of Patent: Jun. 22, 1999

[54] AIR CLEANER

[75] Inventors: Toshio Taomo; Fujio Kobayashi, both of Tokyo, Japan

[73] Assignee: Kioritz Corporation, Tokyo, Japan

[21] Appl. No.: 09/019,289

[22] Filed: Feb. 5, 1998

[30] Foreign Application Priority Data

Feb. 10, 1997 [JP] Japan ........................... 9-26436

[51] Int. Cl.⁶ .................................................. B01D 45/00
[52] U.S. Cl. ............................ 55/385.3; 55/497; 55/498; 55/500; 55/503; 210/487; 210/488
[58] Field of Search ............................. 55/385.3, 497, 55/498, 500, 503; 123/198 E; 210/487, 488, 492, 457

[56] References Cited

U.S. PATENT DOCUMENTS

| | | | |
|---|---|---|---|
| 3,937,663 | 2/1976 | Bessiere | 55/498 |
| 4,075,106 | 2/1978 | Yamazaki | 55/498 |
| 4,151,095 | 4/1979 | Wright | 55/498 |
| 4,560,477 | 12/1985 | Moldow | 55/498 |
| 4,710,297 | 12/1987 | Suzuki et al. | 55/498 |
| 4,799,944 | 1/1989 | Dixon et al. | 55/529 |
| 5,128,039 | 7/1992 | Gabbrielson | 55/498 |

FOREIGN PATENT DOCUMENTS

| | | | |
|---|---|---|---|
| JA 0093954 | 6/1983 | Japan | 55/498 |
| JE 0031535 | 7/1985 | Japan | 55/498 |
| J6 2216620 | 9/1987 | Japan | 55/498 |
| 0812318 | 3/1981 | Russian Federation | 55/498 |

*Primary Examiner*—Jay H. Woo
*Assistant Examiner*—Minh-Chau T. Pham
*Attorney, Agent, or Firm*—Baker & Botts, L.L.P.

[57] ABSTRACT

An air cleaner provided with a bellows-like air cleaning filter includes an air permeable and pliable strip-like mesh element (3), a plurality of rectangular plastic frames (4) arrayed side by side with a predetermined pitch on one or both surfaces and along the full length of the mesh element (3), the plastic frames (4) being injection-molded and provided at both end portions in the width-wise direction with angled protrusions (5) having an approximately triangular cross-section and hinge portions (7) formed by thinning or linearly grooving a joint portion of the frames (4) between neighboring plastic frames (4). The bellows-like air cleaning filter is employed by transforming it into a cylindrical shape and fitting end caps (9) thereto.

10 Claims, 9 Drawing Sheets

AIR CLEANER

BACKGROUND OF THE INVENTION

1. Field of the Invention

The present invention relates to an air cleaner which is suited for use in the suction system of a small air-cooled two-stroke gasoline engine of a portable working machine. More particularly, the invention relates to an air cleaner provided with a novel bellows-like air cleaning filter.

2. The Prior Art

Figure 15:
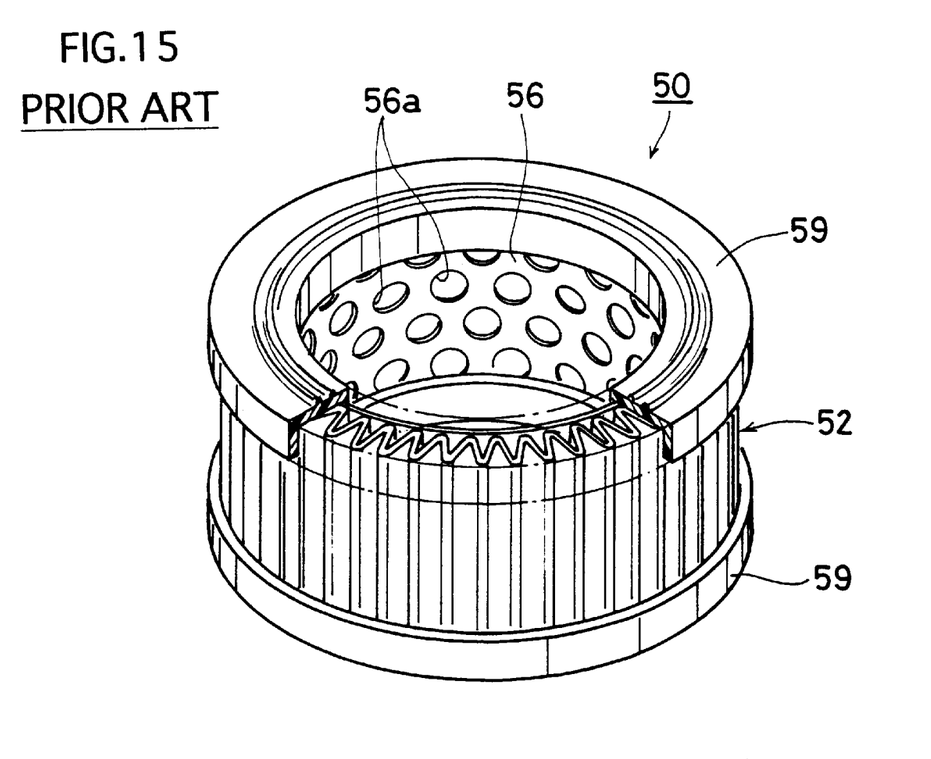
FIG. 15 is a partially sectioned perspective view of one example of a conventional air cleaner.
Figure 16:
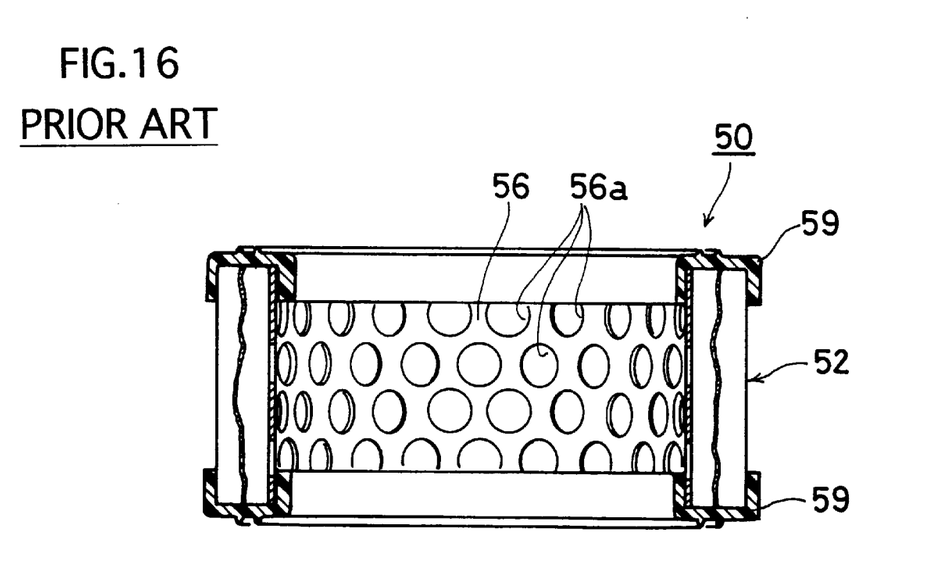
FIG. 16 is a vertical sectional view illustrating the conventional air cleaner of FIG. 15.

A typical example of the conventional air cleaner is shown in FIGS. 15 and 16. This air cleaner 50 is intended to be employed in the suction system of a small air-cooled two-stroke gasoline engine, of a portable working machine for instance, and is provided with an air cleaning filter 52 made of an air-permeable filter paper folded into a bellows-like shape, in order to increase the filtering area thereof, and formed into a cylindrical shape as shown in FIG. 15. The air cleaner 50 further comprises an inner cylindrical member 56 disposed inside of the air cleaning filter 52, which functions as a shape-retaining member to maintain the air cleaning filter 52 cylindrical in shape. The cylindrical member 56 is made of punched metal having a large number of vent holes 56a. An annular end cap 59 is attached to each of the upper and lower end portions of the air cleaning filter 52 and the inner cylindrical body 56.

Since the bellows-like air cleaning filter 52 is formed of a filter paper in the conventional air cleaner 50 as described above, it is not only impossible to wash the air cleaning filter 52 with water or gasoline, but it is also difficult to clean the filter 52 by use of compressed air. This presents a problem in the maintenance of the air cleaning filter 52. Furthermore, since an air cleaning filter 52 that is made of a bellows-like filter paper is not strong enough to retain its cylindrical shape by itself, some kind of shape-retaining member (e.g. the inner cylindrical member 56 made as a punched metal member) is required to retain the cylindrical shape of the filter 52, thus increasing manufacturing and assembly costs.

SUMMARY OF THE INVENTION

The present invention has been made under the circumstances described above. It is therefore an object of the invention to provide an air cleaner that can be easily washed or cleaned by water, gasoline or compressed air, thus facilitating maintenance of the air cleaner, and that can be employed without necessitating the use of an additional shape-retaining member. This not only reduces the number of parts and manufacturing cost, but also simplifies assembling of the air cleaner.

According to the present invention, there is provided an air cleaner provided with a bellows-like air cleaning filter comprising an air permeable and pliable strip-like mesh element, a predetermined number of rectangular plastic frames that are arrayed side by side with a predetermined pitch on one or both surfaces and along the full length of the mesh element, and hinge portions formed between neighboring, i.e., adjacent, plastic frames.

According to a preferred embodiment of the bellows-like air cleaning filter of the present invention, a joint portion between neighboring plastic frames is thin-walled or linearly grooved so as to provide a hinge portion. Each of the plastic frames is provided at both end portions (in the width-wise direction) with angled protrusions. According to a preferred embodiment of the invention, each of the angled protrusions is approximately triangular in cross-section, with the internal angles thereof being set at predetermined angles.

According to another preferred embodiment of the bellows-like air cleaning filter of the present invention, neighboring pairs of the plastic frames are folded via the aforementioned joint portions therebetween in opposite directions alternately from each other so as to allow the angled protrusions of the neighboring pairs of frames to contact each other, thereby transforming the bellows-like air cleaning filter into a cylindrical shape.

According to another preferred embodiment of the air cleaner of the present invention, an annular cap is removable attached to each of both end portions in the width-wise direction of the cylindrical air cleaning filter.

According to another preferred embodiment of the air cleaner of the present invention, the air cleaning filter is injection-molded with the mesh element being employed as an insert.

According to another preferred embodiment of the air cleaner of the present invention, the air cleaner is provided with a bellows-like air cleaning filter which comprises an air permeable and pliable strip-like mesh element, a predetermined number of generally rectangular plastic frames that are arrayed side by side with a predetermined pitch on both surfaces and along the full length of the mesh element, the plastic frames being injection-molded with the mesh element being employed as an insert and provided at both end portions (in the width-wise direction) with angled protrusions having an approximately triangular cross-section, and hinge portions formed by thinning or linearly grooving a joint portion between neighboring plastic frames. In addition, the plastic frames are faced to each other with the mesh element interposed therebetween, the angled protrusions formed on both surfaces of the mesh element are in 180° rotational symmetry with respect to the mesh element (a symmetry surface), and the neighboring pairs of plastic frames are alternately folded via the hinge portions therebetween in opposite directions to each other to bring the angled protrusions of the neighboring pairs of frames into contact with each other, thereby forming the bellows-like air cleaning filter into a cylindrical shape. An annular cap is removable attached to each of both end portions, in the width-wise direction, of the cylindrical air cleaning filter.

According to these preferable embodiments of the air cleaner of the present invention, since a mesh element is employed as an air cleaning filter in place of the filter paper that has conventionally been employed, and plastic frames are integrally attached to the mesh filter, the air cleaning filter of the invention can not only be easily washed on-site by use of water or gasoline but can also be easily cleaned by use of compressed air. As a result, maintenance of the air cleaner is facilitated. Additionally, since the plastic frames are constructed to function as a shape-retaining member to retain the cylindrical shape of the air cleaning filter, no additional shape-retaining member (such as an inner cylinder body made of a punched metal for instance) is required, thus reducing the manufacturing and assembly costs of the air cleaner.

Furthermore, since hinge portions are formed respectively at joint portions between neighboring plastic frames, thereby allowing neighboring pairs of the plastic frames to be alternately folded via the hinge portions in opposite directions to each other, and, at the same time, the angled protrusions of neighboring pairs of said plastic frames are brought into contact with each other, so as to form the bellows-like air cleaning filter into a cylindrical shape, it is possible to assure a sufficient filtering area which is more than comparable to that of the conventional air cleaning filter, thus making it possible to improve cleaning efficiency.

DETAILED DESCRIPTION OF PREFERRED EMBODIMENTS OF THE INVENTION

The present invention will be further explained with reference to the drawings depicting various embodiments according to the present invention.

Figure 1:
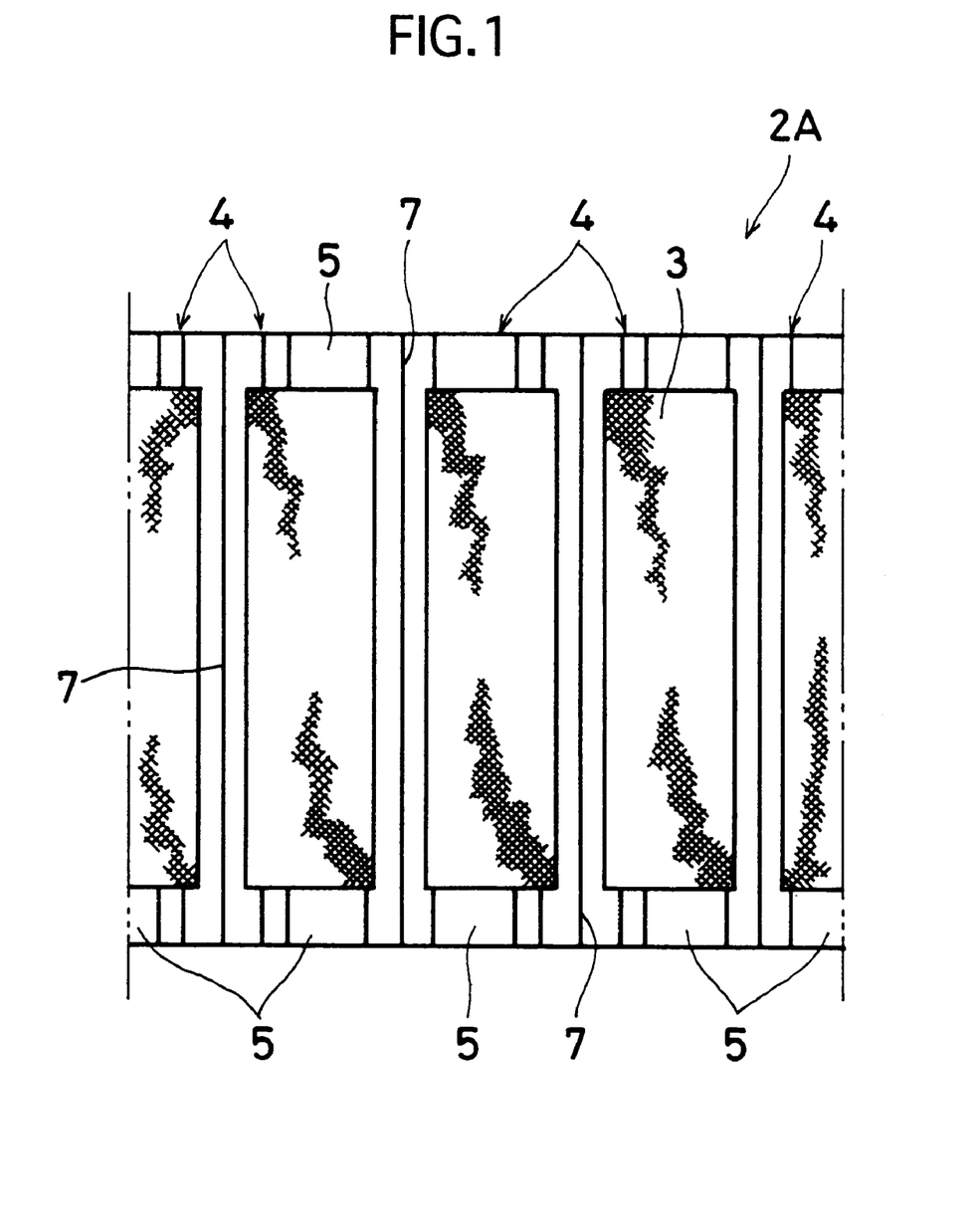
FIG. 1 is a partial side view of an unfolded bellows-like air cleaning filter according to a first embodiment of the air cleaner of the present invention.
Figure 2A:
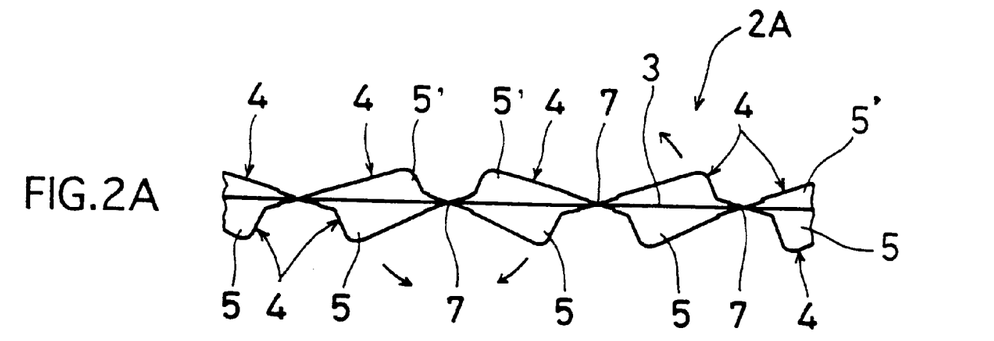
FIG. 2A is a partial plan view of the air cleaning filter of the first embodiment shown in FIG. 1.
Figure 2B:
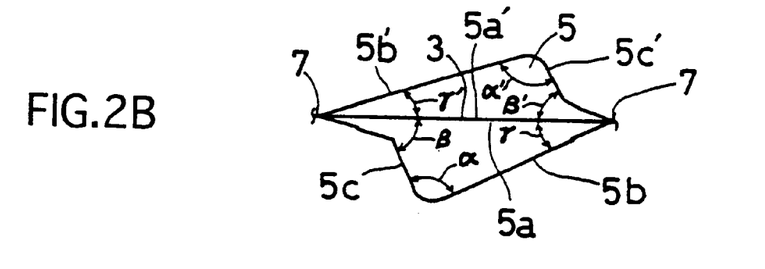
FIG. 2B is an enlarged plan view of one section of the air cleaning filter of FIG. 2A.

FIGS. 1, 2A and 2B illustrate a bellows-like air cleaning filter according to a first embodiment of the air cleaner of the present invention. As there shown, the bellows-like air cleaning filter 2A is constituted by a mesh element 3 which is made of an air permeable and pliable elongated nylon strip, a predetermined number of relatively rigid rectangular plastic frames 4 that are arrayed side by side with a predetermined pitch on both surfaces and along the full length of the mesh element 3. The plastic frames 4 are preferably injection-molded with the mesh element 3 employed as an insert and are provided at both end portions in the widthwise direction (the vertical direction in FIG. 1) with angled protrusions 5 and 5' having an approximately triangular cross-section and extending from both surfaces of the mesh element 3 (see FIGS. 2A and 2B). Hinge portions 7 are formed by thinning the frames 4 (or exposing the mesh element 3) or linearly grooving a joint portion between neighboring pairs of the plastic frames 4.

More specifically, the array of plastic frames 4 formed on one surface of the mesh element 3 are disposed to face the other array of plastic frames 4 formed on the opposite surface of the mesh element 3 with the mesh element 3 being interposed therebetween. In this case, the angled protrusions 5 and 5' extending from both surfaces of the mesh element 3 are in 180° rotational symmetry with respect to the mesh element 3 (a symmetry surface) as shown in FIGS. 2A and 2B.

The angled protrusions 5 of the frames 4 which extend downward from the mesh element 3 in FIGS. 2A and 2B are each of identical size and dimension. Each angled protrusion 5 is constituted by a bottom surface 5a which is attached to the mesh element 3, a long slanting surface 5b which is slanted by an angle of $\gamma$ with respect to the bottom surface 5a, and a short slanting surface 5c which is slanted by an angle of $\beta$ with respect to the bottom surface 5a. The angle $\alpha$ between the long slanting surface 5b and the short slanting surface 5c is approximately a right angle.

On the other hand, the angled protrusions 5' which extend upward from the mesh element 3 in FIGS. 2A and 2B are each also of the identical size and dimension, but the cross-sectional area (height) of each angled protrusion 5' is smaller than that of the opposed angled protrusion 5. Each of the angled protrusions 5' is constituted by a bottom surface 5a' which is attached to the mesh element 3, a long slanting surface 5b' which is slanted by an angle of $\gamma'$ with respect to the bottom surface 5a', and a short slanting surface 5c' which is slanted by an angle of $\beta'$ with respect to the bottom surface 5a'. The angle $\alpha'$ between the long slanting surface 5b' and the short slanting surface 5c' is approximately a right angle.

Figure 3:
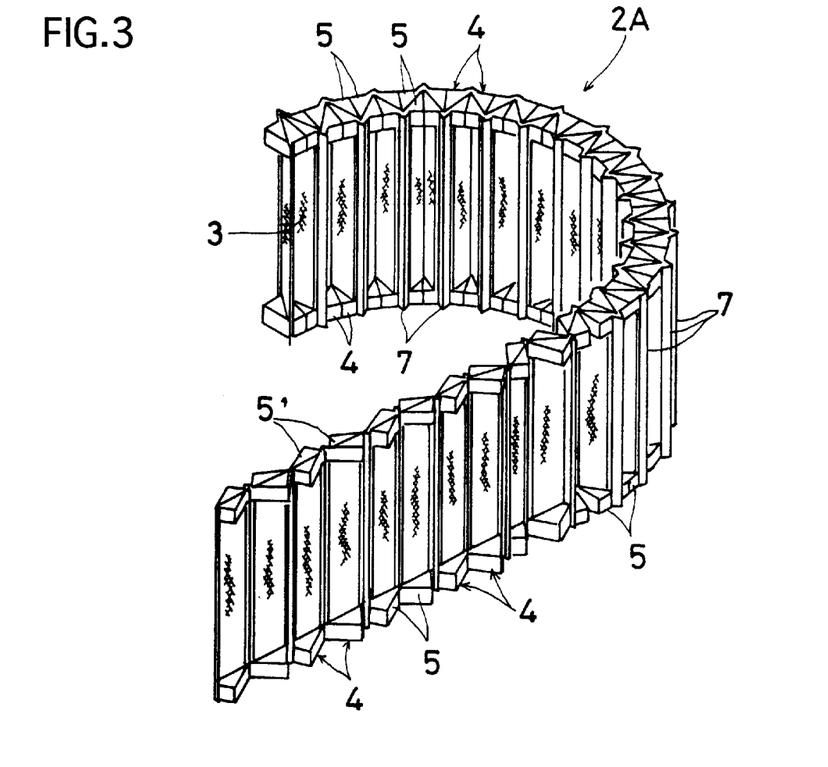
FIG. 3 is a perspective view illustrating the folding process of the air cleaning filter of the first embodiment shown in FIG. 1.

The bellows-like air cleaning filter 2A is formed into a cylindrical shape as shown in FIG. 3, i.e. neighboring pairs of plastic frames 4 are alternately folded via the hinge portions 7 in opposite directions to each other so as to bring the long slanting surfaces 5b and 5b, as well as the long slanting surfaces 5b' and 5b', of neighboring pairs of the angled protrusions 5 and 5' into contact with each other. Since the angled protrusions 5' are smaller in cross-sectional area (height) than the opposed angled protrusions 5, when the bellows-like air cleaning filter 2A is folded as described above the short slanting surfaces 5c are positioned to constitute the outer periphery, while the short slanting surfaces 5c' are positioned to constitute the inner periphery, of the cylindrical body. The bellows-like air cleaning filter 2A is thereby formed into a cylindrical shape having a predetermined inner diameter and a predetermined outer diameter (see FIG. 4).

In other words, since the angles of $\beta$, $\beta'$, $\gamma$ and $\gamma'$ of the angled protrusions 5 and 5' on both sides of the mesh element 3 are set in advance at predetermined angles according to this embodiment, the inner and outer diameters of the cylindrical body to be formed from the filter 2A can be controlled such that the bellows-like air cleaning filter 2A can be formed into a cylindrical body having predetermined inner and outer diameters.

Figure 4:
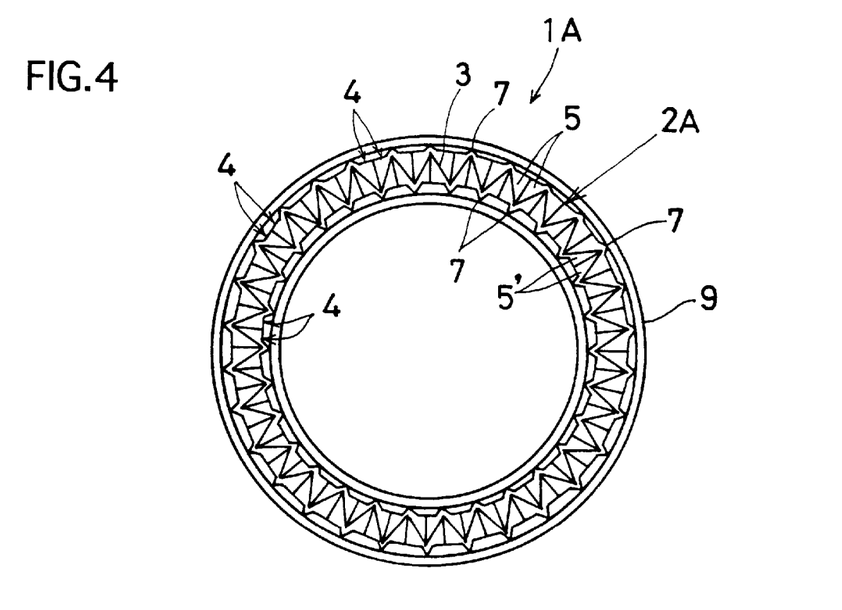
FIG. 4 is a horizontal cross-sectional view illustrating the assembled state of the air cleaning filter of the first embodiment shown in FIG. 1.
Figure 5:
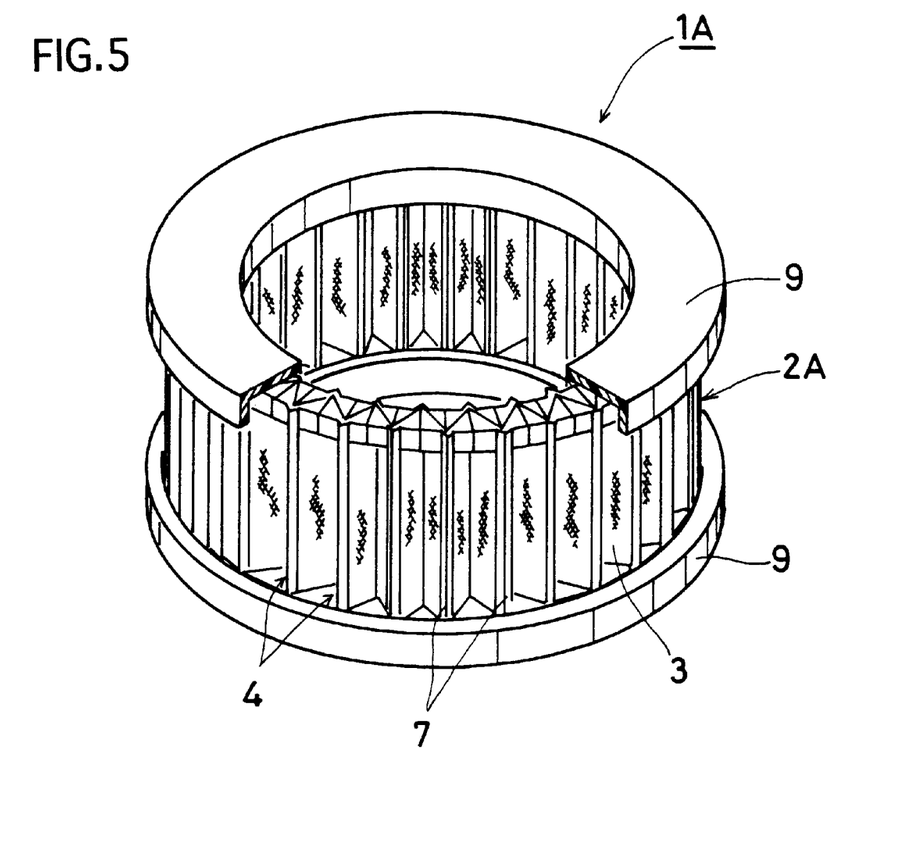
FIG. 5 is a partially sectioned perspective view of the air cleaning filter of the first embodiment shown in FIG. 1., as assembled.
Figure 6:
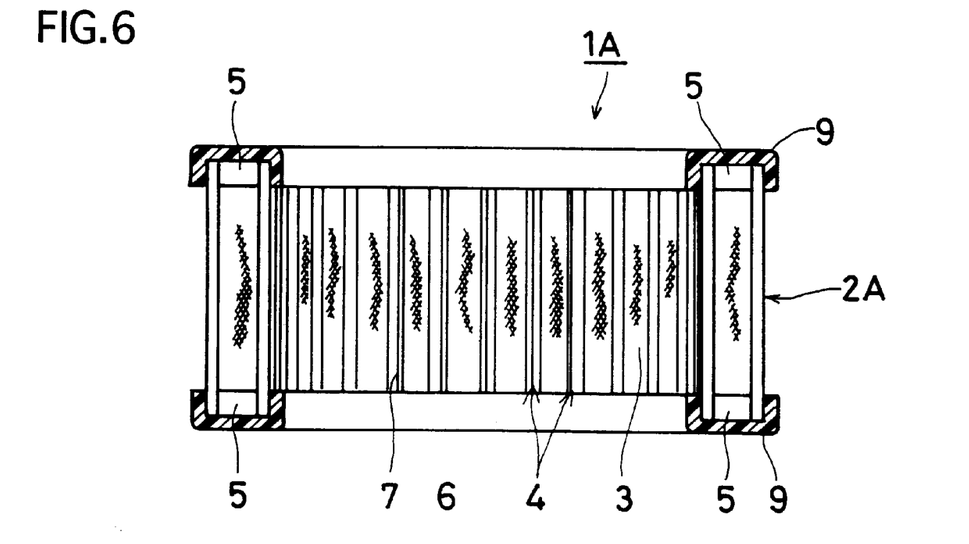
FIG. 6 is a vertical sectional view illustrating the assembled state of the air cleaning filter of the first embodiment shown in FIG. 1.

Then, as shown in FIGS. 4 to 6, an annular cap 9 is removable attached to each of both end portions, in the width-wise direction, of the cylindrically- shaped air cleaning filter 2A to complete the assembly of the air cleaner 1A.

Furthermore, both end portions in the peripheral (or longitudinal) direction of the bellows-like air cleaning filter 2A can also be hermetically sealed through the fitting of the annular caps 9, so that outside air is not suctioned through the end portions.

Since, in the air cleaner 1A of the embodiment constructed as illustrated above, a plastic mesh element 3 is employed as an air cleaning filter in place of the filter paper which has been conventionally employed, and, at the same time, since the plastic frames 4 are integrally attached to the mesh filter 3, the air cleaning filter 2A of the invention can not only be easily washed on-site by use of water or gasoline but also can easily be cleaned by use of compressed air. As a result, maintenance of the air cleaner is facilitated. Additionally, since the plastic frames 4 are constructed to function as a shape-retaining member for retaining the cylindrical shape of the air cleaning filter, no additional shape-retaining member (such as an inner cylinder body made of a punched metal for instance) is required, thus saving in manufacturing and assembly costs of the air cleaner.

Furthermore, since the hinge portions 7 are formed respectively at joint portions between neighboring plastic frames 4, thereby allowing the neighboring pairs of plastic frames 4 to be alternately folded via the hinge portions 7 in opposite directions to each other, and, at the same time, since the respective long slanting surfaces 5b and 5b, as well as the respective long slanting surfaces 5b' and 5b', of neighboring pairs of the angled protrusions 5 and 5' are brought into contact with each other, thereby forming the bellows-like air cleaning filter 2A into a cylindrical shape, it is possible to assure a sufficient filtering area which is more than comparable to that of the conventional air cleaning filter, thus making it possible to improve the cleaning efficiency.

Figure 7:
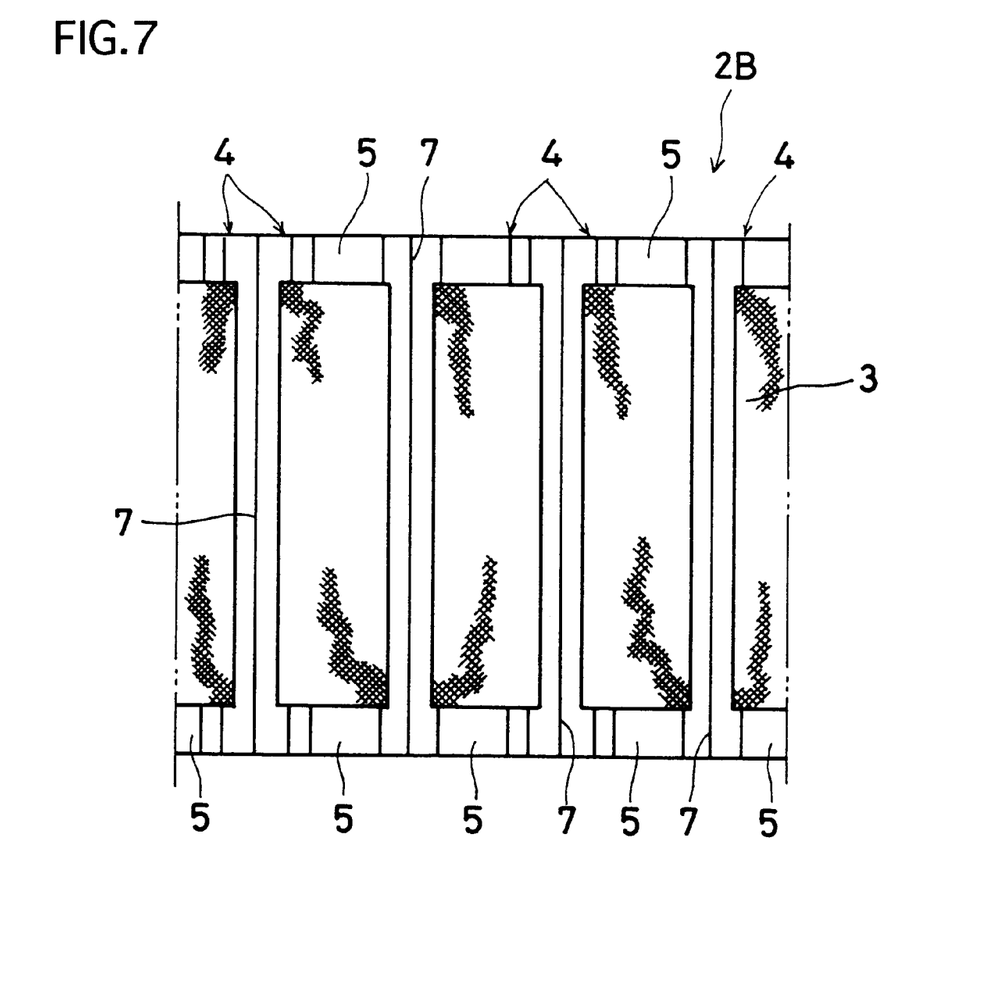
FIG. 7 is a partial side view showing a bellows-like air cleaning filter according to a second embodiment of the air cleaner of the present invention.
Figure 8:
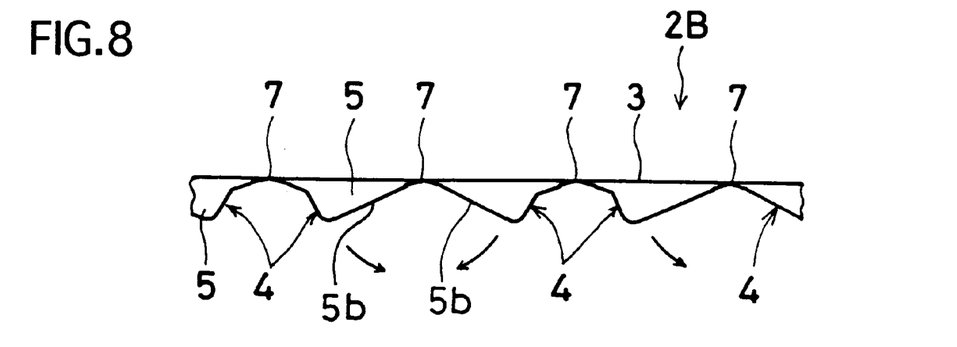
FIG. 8 is a partial plan view showing the air cleaning filter of the second embodiment shown in FIG. 7.
Figure 9:
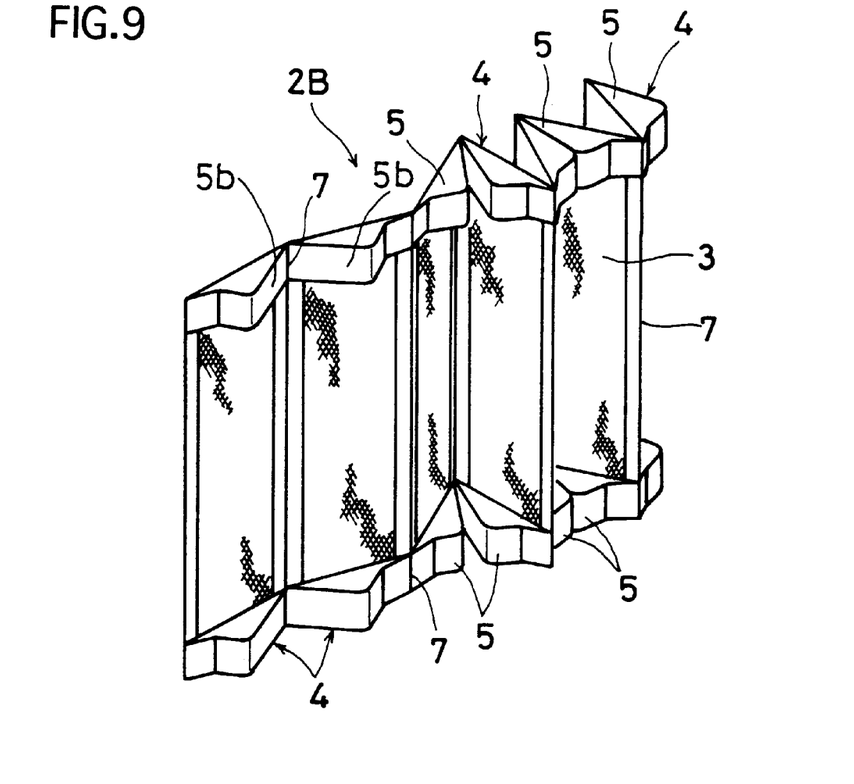
FIG. 9 is a partial perspective view illustrating the assembling process of the air cleaning filter of the second embodiment shown in FIG. 7.

FIGS. 7 to 9 illustrate a bellows-like air cleaning filter according to a second embodiment of the air cleaner of the present invention. The bellows-like air cleaning filter 2B is constructed in the same manner as illustrated in the foregoing first embodiment, except that the rectangular plastic frames 4 are formed only on one surface (the outer peripheral side) of the mesh element 3. The other constituent members are the same as illustrated in the first embodiment and are referred to by the same reference numbers.

Figure 10:
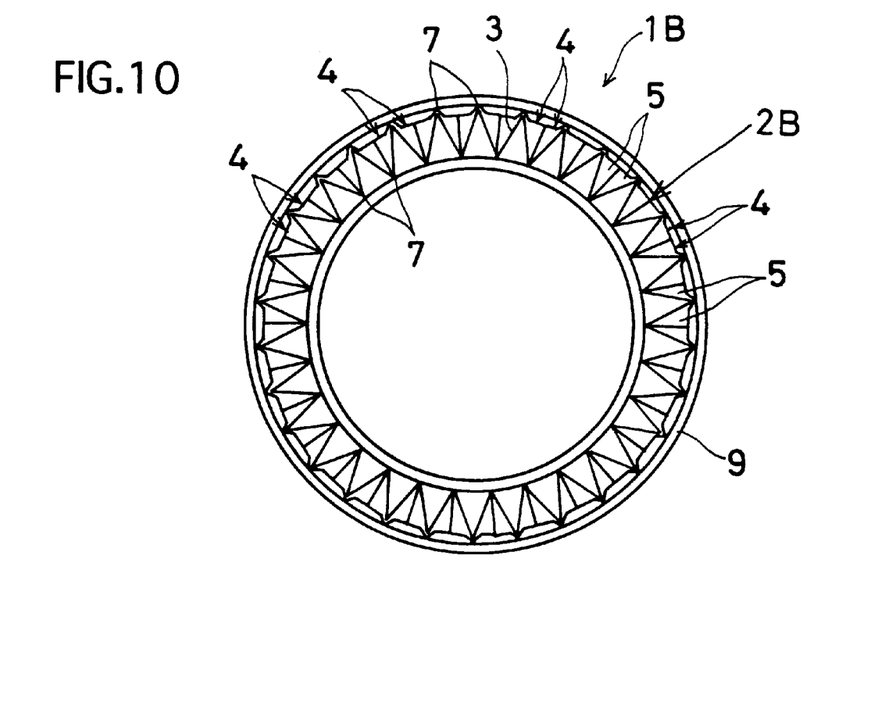
FIG. 10 is a horizontal sectional view illustrating the assembled state of the air cleaning filter of the second embodiment shown in FIG. 7.

In assembling the bellows-like air cleaning filter 2B, the neighboring pairs of plastic frames 4 are alternately folded via the hinge portions 7 in opposite directions to each other such that the long slanting surfaces 5b of adjoining frames 4 contact other, thereby causing the short slanting surfaces 5c of the angled protrusions 5 to be positioned to constitute the outer peripheral surface of cylindrical body, as shown in FIGS. 9 and 10. In this bellows-like air cleaning filter 2B, since the angles β and γ of the angled protrusions 5 are set in advance at predetermined angles, the dimension of the cylindrical body to be formed is controlled by the shape of the protrusions 5 on the outer periphery of the mesh element 3, thereby inevitably transforming the bellows-like air cleaning filter 2B into a cylindrical shape having a predetermined outer diameter (see FIG. 10).

Then, in the same manner as illustrated above, an annular cap 9 is removable attached to each of the upper and lower end portions of the cylindrically-shaped air cleaning filter 2B to complete the assembly of the air cleaner 1B. Almost the same advantageous effects obtained by the aforementioned first embodiment are also obtained in the air cleaner 1B of this second embodiment.

Figure 11:
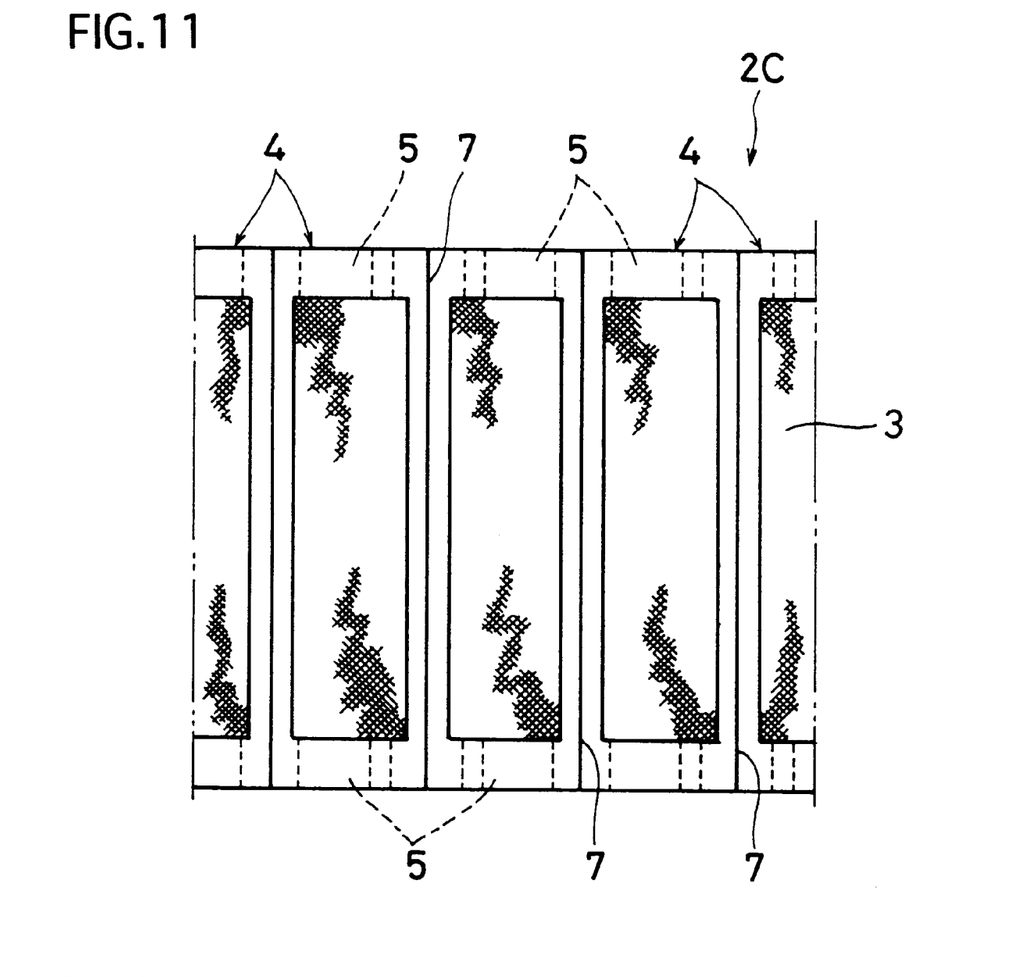
FIG. 11 is a partial side view showing a bellows-like air cleaning filter according to a third embodiment of the air cleaner of the present invention.
Figure 12:
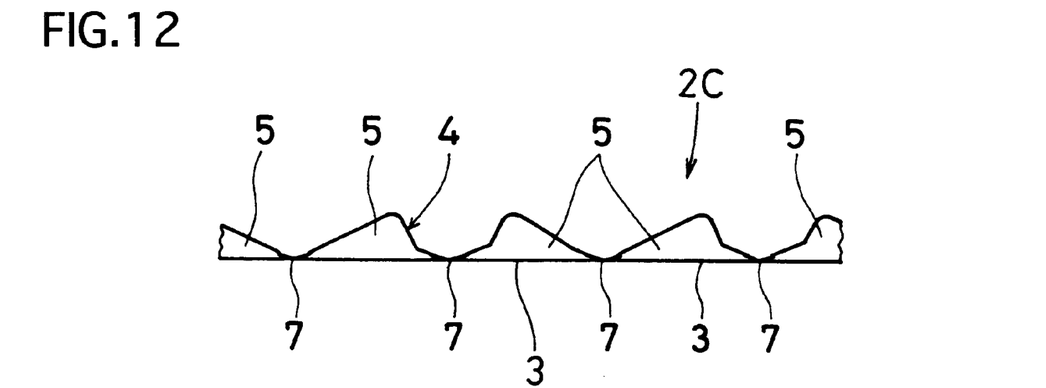
FIG. 12 is a partial plan view showing the air cleaning filter of the third embodiment shown in FIG. 11.
Figure 13:
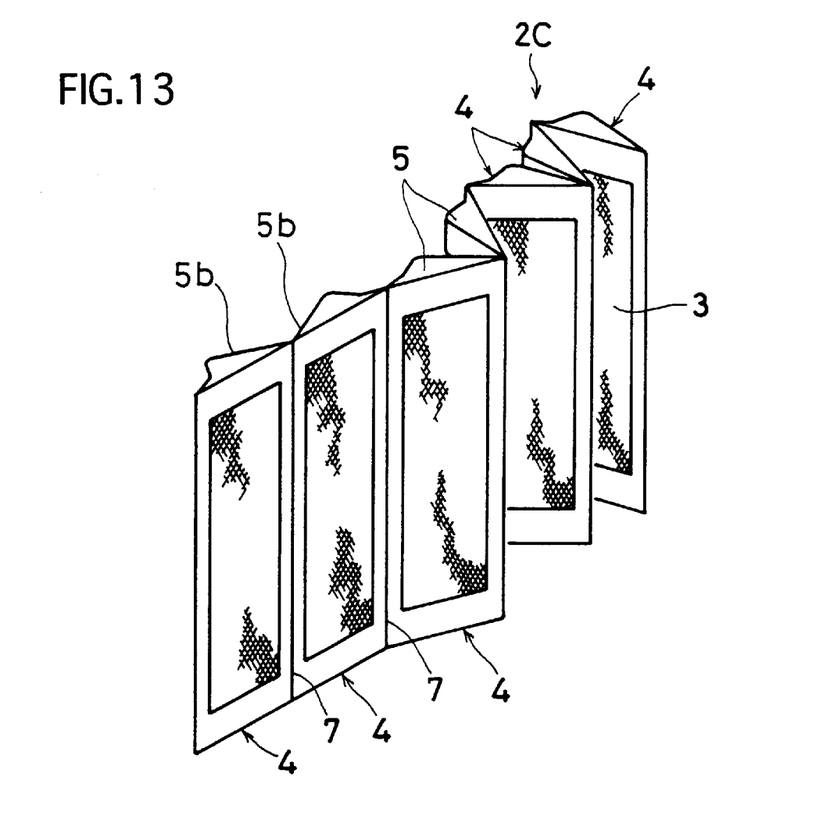
FIG. 13 is a partial perspective view illustrating the assembling process of the air cleaning filter of the third embodiment shown in FIG. 11.

FIGS. 11 to 13 illustrate a bellows-like air cleaning filter according to a third embodiment of the air cleaner of the present invention. The bellows-like air cleaning filter 2C is constructed in the same manner as illustrated in the foregoing first embodiment, except that the rectangular plastic frames 4 are formed only on the inner peripheral side of the mesh element 3 in contrast to the aforementioned second embodiment. The constituent members are the same as illustrated in the above first and second embodiments, and are referred to by the same reference numbers.

Figure 14:
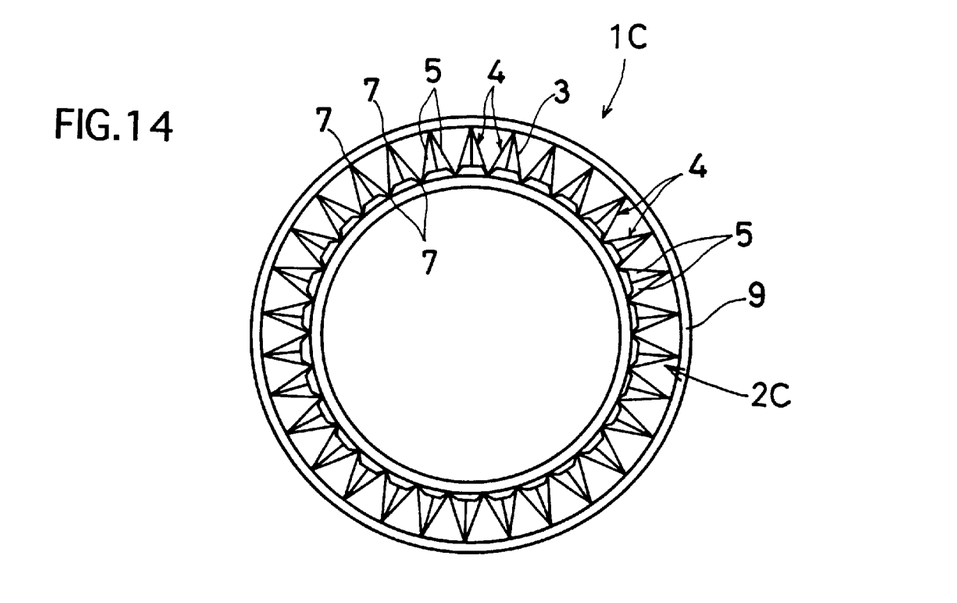
FIG. 14 is a horizontal sectional view illustrating the assembled state of the air cleaning filter of the third embodiment shown in FIG. 11.

In assembling of the bellows-like air cleaning filter 2C, the neighboring pairs of plastic frames 4 are alternately folded via the hinge portions 7 in opposite directions to each other to bring the long slanting surfaces 5b of the respective frames 4 into contact with each other, thereby causing the short slanting surfaces 5c of the angled protrusions 5 to be positioned to constitute the inner peripheral surface of cylindrical body, as shown in FIGS. 13 and 14. In this bellows-like air cleaning filter 2C, since the angles β and γ of the angled protrusions 5 are set in advance at predetermined angles, the dimension of the cylindrical body to be formed is controlled by the shape of the protrusions 5 on the inner periphery, thereby inevitably transforming the bellows-like air cleaning filter 2C into a cylindrical shape having a predetermined inner diameter (see FIG. 14).

Then, in the same manner as illustrated above, an annular cap 9 is removable attached to each of the upper and lower end portions of the cylindrically-shaped air cleaning filter 2C to complete the assembly of the air cleaner 1C. Almost the same advantageous effects obtained by the aforementioned first and second embodiments can be obtained in the air cleaner 1C of this third embodiment.

In the foregoing description, the present invention has been explained with reference to three specific embodiments. It will be understood, however, that the invention is not limited to such embodiments, but may be variously modified within the spirit and scope of the invention as set forth in the claims.

For example, the material for the mesh element 3 is not confined to a plastic material (synthetic resin), but may be formed of a super fine stainless steel wire and the like.

As will be clearly understood from the foregoing description, since a pliable strip-like mesh element is employed as an air cleaning filter in place of the filter paper that has been conventionally employed, and at the same time, since plastic frames are integrally attached to the mesh filter, the air cleaning filter can not only be easily washed on-site of use with water or gasoline but can also be easily cleaned by use of compressed air. Consequently, maintenance of the air cleaner is facilitated. Additionally, since the plastic frames are constructed to function as a shape-retaining member to retain the cylindrical shape of the air cleaning filter, no additional shape-retaining member (such as an inner cylinder body made of a punched metal for instance) is required, thus saving manufacturing cost and facilitating the manufacture and assembly of the air cleaner.

Furthermore, since hinge portions are formed respectively at joint portions between adjoining plastic frames, thereby allowing neighboring pairs of plastic frames to be alternately folded via the hinge portion in opposite directions to each other, and, at the same time, since the angled protrusions of neighboring pairs of the plastic frames are brought into contact with each other, thereby forming the bellows-like air cleaning filter into a cylindrical shape, it is possible to assure a sufficient filtering area which is more than comparable to that of the conventional air cleaning filter, thus making it possible to improve cleaning efficiency.

I claim:

1. An air cleaner comprising:

a reusable air permeable and pliable mesh element;

a plurality of generally rectangular plastic frames arrayed side by side through which said mesh element is inserted, each of said frames having one or more surfaces in contact with one or more surfaces of an adjacent one of said frames along the full length of said mesh element, wherein one side of said mesh element forms the innermost surface of said air cleaner and the immediately opposite side of said mesh element forms the outermost surface of said air cleaner; and a hinge portion formed between each pair of neighboring plastic frames.

2. The air cleaner according to claim 1, wherein said hinge portion is constituted by a thin-walled or linearly grooved portion of the plastic frames.

3. The air cleaner according to claim 1, wherein said plastic frames are provided respectively at both end portions thereof in the width-wise direction with angled protrusions.

4. The air cleaner according to claim 3, wherein each of said angled protrusions is approximately triangular in transverse cross section.

5. The air cleaner according to any one of claims 1, 2 and 3, wherein neighboring pairs of said plastic frames are folded via said joint portions in opposite directions from each other alternately so as to transform the air cleaning filter into a cylindrical shape.

6. The air cleaner according to claim 4, wherein said neighboring pairs of the plastic frames are folded via said joint portions in opposite directions from each other alternately so as to bring said angled protrusions of each neighboring pair of the plastic frames into contact to each other.

7. The air cleaner according to any one of claims 1, 2 and 3, wherein said air cleaning filter is formed into a cylindrical shape and an annular cap is attached to each of both end portions in the width-wise direction of the cylindrical air cleaning filter.

8. The air cleaner according to claim 6, wherein said air cleaning filter is formed into a cylindrical shape and an annular cap is attached to each of both end portions in the width-wise direction of the cylindrical air cleaning filter.

9. The air cleaner according to any one of claims 1, 2, 3, 6 and 8, wherein said air cleaning filter is injection-molded with said mesh element being employed as an insert.

10. An air cleaner comprising:

a reusable air permeable and pliable mesh element;

a plurality of rectangular plastic frames arrayed side by side through which said mesh element is inserted, each of said frames having one or more surfaces in contact with one or more surfaces of an adjacent one of said frames along the full length of said mesh element, wherein one side of said mesh element forms the innermost surface of said air cleaner and the immediately opposite side of said mesh element forms the outermost surface of said air cleaner, said plastic frames being (i) injection-molded with said mesh element being employed as an insert and (ii) provided at both end portions in the width-wise direction with angled protrusions having an approximately triangular cross-section, said angled protrusions being formed both surfaces of the mesh element in 180° rotational symmetry with respect to said mesh element;

a hinge portion formed by thinning or linearly grooving the joint portion between each pair of the neighboring plastic frames;

said plastic frames being faced towards each other with said mesh element being interposed therebetween, said neighboring pairs of the plastic frames being alternately folded via said hinge portions in opposite directions to each other to bring said angled protrusions of said neighboring pairs of the plastic frames into contact with each other to form the air cleaning filter into a cylindrical shape; and an annular cap attached to each of both end portions, in the width-wise direction, of the cylindrical air cleaning filter.

* * * * *